United States Patent [19]

Aardema

[11] Patent Number: 5,645,263
[45] Date of Patent: Jul. 8, 1997

[54] PILOT VALVE FOR A FLOW AMPLYIFYING POPPET VALVE

[75] Inventor: James A. Aardema, Joliet, Ill.

[73] Assignee: Caterpillar Inc., Peoria, Ill.

[21] Appl. No.: 130,937

[22] Filed: Oct. 4, 1993

[51] Int. Cl.[6] ............................................. F16K 31/383
[52] U.S. Cl. ........................... 251/30.02; 137/596.14; 137/487.5; 251/35; 251/44
[58] Field of Search ............... 137/596.14, 596.15, 137/487.5, 489; 251/35, 30.02, 30.03, 30.04, 30.05, 44, 30.01

[56]  References Cited

U.S. PATENT DOCUMENTS

| 2,575,272 | 11/1951 | Harris | 251/30.04 |
|---|---|---|---|
| 2,624,542 | 1/1953 | Ghormley | 251/30.02 |
| 2,755,058 | 7/1956 | Margrave | 251/30.02 |
| 2,815,921 | 12/1957 | Bigelow | 251/38 |
| 2,937,846 | 5/1960 | Hannart et al. | 251/30.02 |
| 3,033,228 | 5/1962 | Mohler | 251/30.04 |
| 3,667,722 | 6/1972 | Katz et al. | 251/30.04 |
| 3,903,919 | 9/1975 | Zeuner | 251/44 |
| 3,905,575 | 9/1975 | Zeuner et al. | 251/30.02 |
| 3,977,649 | 8/1976 | Zeuner et al. | 251/30.02 |
| 4,305,566 | 12/1981 | Grawunde | 251/30.02 |
| 4,478,245 | 10/1984 | Bender | 251/30.01 |
| 4,535,809 | 8/1985 | Andersson | 137/596.14 |
| 4,585,206 | 4/1986 | Itoh | 251/30.02 |
| 4,593,715 | 6/1986 | Stich et al. | 251/35 |
| 4,809,746 | 3/1989 | Wolfges | 251/44 |
| 4,813,447 | 3/1989 | Ichiryu et al. | 137/486 |
| 4,905,959 | 3/1990 | Andersson | 251/35 |
| 4,921,208 | 5/1990 | LeMarca | 251/30.04 |
| 5,137,254 | 8/1992 | Aardema et al. | 251/35 |
| 5,255,672 | 10/1993 | Uehara et al. | 251/35 |

OTHER PUBLICATIONS

SAE Technical Paper Series, Society of Automotive Engineers #810697 "Development of a High Pressure Load Sensing Mobile Valve" 1981.

*Primary Examiner*—George L. Walton
*Attorney, Agent, or Firm*—John W. Grant

[57]  ABSTRACT

A flow amplifying poppet valve has a main poppet for controlling fluid flow from an inlet port to an outlet port of a main fluid passage. The position of the main poppet is controlled by controlling the pressure in a first control chamber adjacent the main poppet with a second stage poppet of a two-stage pilot valve disposed within a pilot passage communicating the first control chamber with the outlet port. The position of the second stage poppet is controlled by controlling the pressure in a second control chamber adjacent the second stage poppet with a pilot stage poppet that has a frusto-conical section urged into sealing engagement with the second stage poppet by a spring. A device selectively exerts a control force to move the first stage poppet in a valve opening direction to establish a variable flow control orifice between the frusto-conical section and the second stage poppet. This lowers the pressure in the second control chamber allowing the second stage poppet to follow the pilot stage poppet until movement of the pilot stage poppet stops.

11 Claims, 1 Drawing Sheet

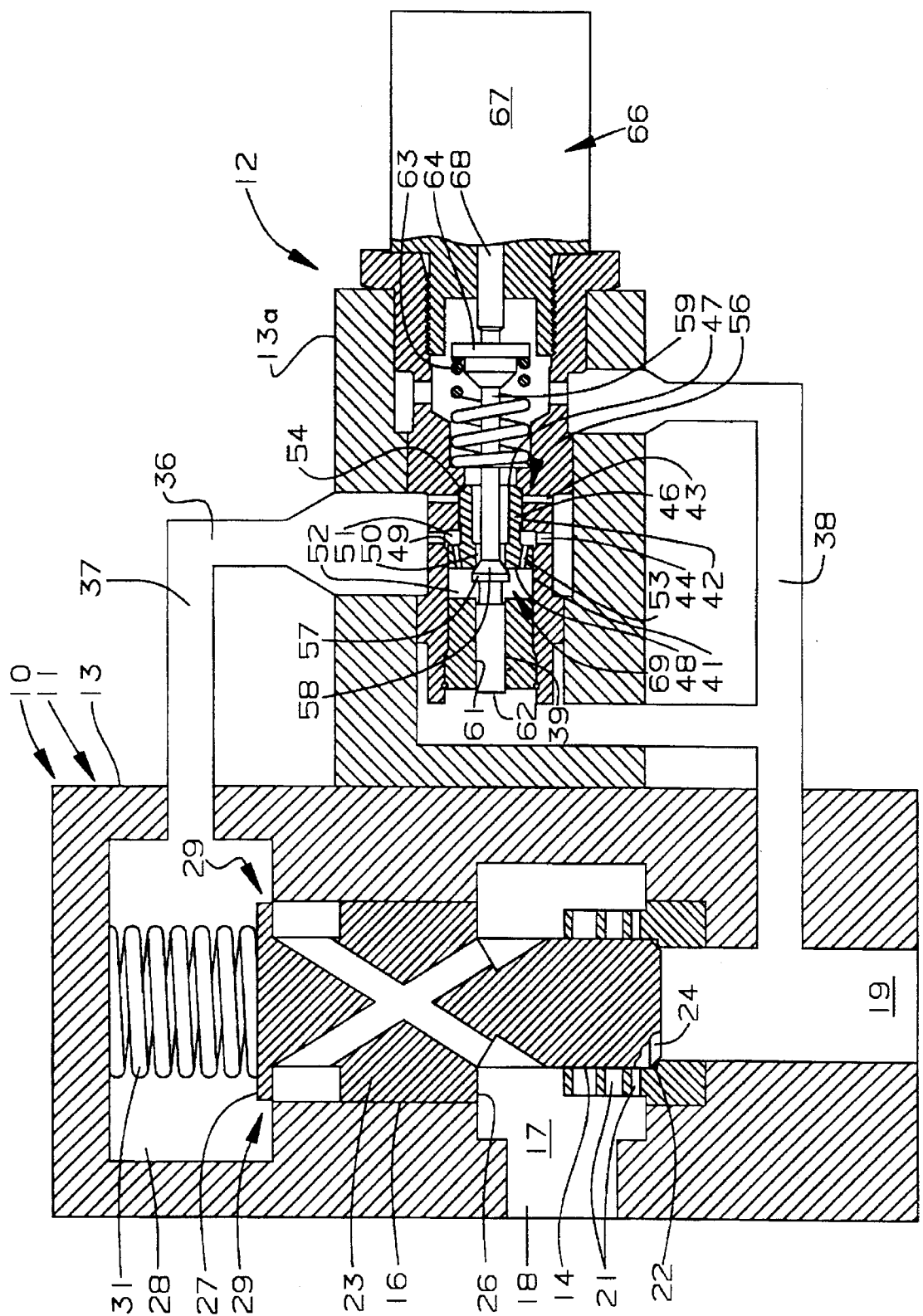

PILOT VALVE FOR A FLOW AMPLYIFYING POPPET VALVE

TECHNICAL FIELD

This invention relates to a poppet type flow control valve and more particularly to a flow amplifying poppet valve having a two stage displacement controlled poppet type pilot valve for controlling the flow of pilot fluid used to actuate the main poppet.

BACKGROUND ART

Flow amplifying poppet valves typically include a poppet having a reduced diameter end seated against a valve seat in the valve housing. Fluid flow from an inlet port through the valve to an outlet port is controlled by controllably moving the poppet off the seat. A basic type of poppet valve has a throttling slot through the poppet to communicate the inlet port pressure to a control chamber at the backside of the poppet. The fluid pressure in the control chamber exerts a closing force on the poppet holding it against the valve seat. A spring is also generally used to hold the valve element against the valve seat when the inlet, control and outlet pressures are all equal.

Controlling the opening position of the poppet is normally accomplished by communicating the control chamber with the outlet port through a variable regulating orifice of a pilot valve. The variable regulating orifice is normally closed so that fluid pressure in the control chamber equals the inlet pressure and the poppet valve element is urged against the seat by the pressure in the control chamber. Opening of the poppet is achieved by controllably opening the variable regulating orifice to communicate the control chamber with the outlet port. This creates a pressure drop through the throttling slot in the poppet such that the inlet pressure urges the valve element off the valve seat as the control pressure drops below the balance pressure. The degree of opening of the poppet is subsequently controlled by controlling the flow through the variable regulating orifice of the pilot valve to regulate the flow through the throttling slot.

One of the problems encountered with the known flow amplifying poppet valves is caused by the flow forces acting on the pilot valve and produce undesirable or uncontrollable results particularly when the pilot valve is a proportional solenoid valve. Even though the pilot flow through the pilot valve is relatively small, the flow forces can be relatively large due to large pressure drops between the control chamber and the outlet port. The flow forces in many cases require the use of a larger more powerful solenoid to move the pilot valve against the flow forces.

The present invention is directed to overcoming one or more of the disadvantages or problems as set forth above.

DISCLOSURE OF THE INVENTION

In one aspect of the present invention, a flow amplifying poppet valve includes a housing having a main fluid passage having an inlet port and an outlet port, and a main poppet disposed between the inlet and outlet ports for controlling fluid flow between the inlet and outlet ports and defining a first control chamber in the housing. The poppet includes a first annular reaction surface continuously subjected to pressurized fluid from the inlet port and a variable orifice communicating the inlet port with the control chamber. A pilot fluid passage includes an inlet portion communicating with the first control chamber and an outlet portion communicating with the outlet port. A two stage pilot valve is disposed in the pilot fluid passage between the inlet and outlet portions and includes a primary poppet having first and second ends, a fluid passage extending axially therethrough and a second annular reaction surface continuously subjected to pressurized fluid from the inlet portion. The second stage poppet is movable between a closed flow blocking position and an open position establishing a variable flow regulating orifice between the inlet and outlet portions. A first stage poppet has a stem extending through the fluid passage in the second stage poppet and a frusto-conical section engagable with one end of the second stage poppet. An orifice communicates the inlet portion with the second control chamber. A means is provided for selectively exerting a variable control force to urge the first stage poppet in a valve opening direction so that variable communication is established between the frusto-conical section and the second stage poppet.

The present invention provides an improved flow amplifying poppet valve having a main poppet actuated by a pilot valve that reduces the flow forces acting thereon by the pilot flow passing therethrough. More specifically, the pilot valve is a two-stage displacement controlled solenoid actuated poppet valve having a second stage poppet for controlling the main pilot flow and a pilot stage poppet for controlling the second stage poppet with the position of the pilot stage poppet being controlled by a solenoid. Since the pilot stage poppet handles only a small portion of the total pilot flow, the flow forces acting on the pilot stage poppet and, thus, exerted against the solenoid are very small.

BRIEF DESCRIPTION OF THE DRAWINGS

The sole FIGURE is a cross-sectional view of an embodiment of the present invention.

BEST MODE FOR CARRYING OUT THE INVENTION

A flow amplifying poppet valve 10 includes a main poppet valve section 11 and a pilot valve section 12 disposed within a composite body 13. The main poppet valve section 11 includes a pair of concentric bores 14,16, a main fluid passage 17 having an inlet port 18 and an outlet port 19, and a plurality of flow modulating ports 21 communicating the inlet port 18 with the bore 14 and a valve seat 22 disposed between the bore 14 and the outlet port 19. A stepped poppet 23 is slidably disposed in the bores 14,16 to control fluid flow through the modulating ports 21 between the inlet and outlet ports 18,19 and has a frusto-conical section 24 sealingly engaging the valve seat 22 at a closed position of the poppet. An annular reaction B surface 26 is continuously subjected to the pressurized fluid in the inlet port 18 so that the poppet is continuously urged in a valve opening direction. Another reaction surface 27 cooperates with the body to define a control chamber 28. A pair of variable flow control orifices 29 are provided in the poppet to communicate the inlet portion 18 with the control chamber 28. A compression spring 31 resiliently urges the frusto-conical section 24 into sealing engagement with the valve seat 22.

The pilot valve 12 is a two-stage, displacement controlled, electrically actuated poppet valve for controlling the flow of pilot fluid through a pilot passage 36 having an inlet portion 37 communicating with the control chamber 28 and an outlet portion 38 communicating with the outlet portion 19. The poppet valve 12 includes a plurality of concentric bores 39,41 and 42 formed in the body 13, a pair of ports 43 communicating the inlet portion 37 with the bore 42 and a pair of ports 44 communicating the inlet portion with the bore 41. A stepped second stage poppet 46 is slidably disposed in the bores 41,42 and has opposite ends 47,48, an annular reaction surface 49 and a fluid passage 50 extending axially therethrough. The reaction surface 49 cooperates with the body 13 to define an actuation chamber 51 which continuously communicates with the inlet portion 37 through the ports 44. The end 48 cooperates with the body 13 to define a control chamber 52 which communicates with the actuation chamber 51 through a pair of orifices 53. The end 47 includes a frusto-conical section 54 sealingly engaging the body 13 at a closed position of the poppet 46. Leftward movement of the poppet 46 to an open position establishes a variable pilot flow regulating orifice 56 between the inlet and outlet portions 37,38.

A pilot stage poppet 57 includes a frusto-conical section 58, a stem 59 extending through the fluid passage 50 and a plunger 61 slidably disposed in the bore 39 and having an end 62 continually subjected to fluid pressure in the outlet portion 38 such that the fluid pressure generated forces acting on the poppet 57 in one direction are balanced by fluid pressure generated forces acting on the poppet in the opposite direction. A spring 62 is disposed between the body 13 and a spring retainer 64 suitably attached to the stem 59 for resiliently urging the frusto-conical section 58 into sealing engagement with the poppet 46. The frusto-conical section 54 of the poppet 46 in turn is resiliently urged into sealing engagement with the body 13. The minimum cross-sectional area of the fluid passage 50 is substantially equal to the cross-sectional area of the plunger 61.

A means 66 is provided for selectively exerting a variable control force urging the pilot valve 12 in a valve opening direction so that variable communication is established between the control chamber 28 and the outlet port 19. The force exerting means 66 includes a proportional solenoid 67 connected to the body 13 and having a plunger 68 disposed for abutment with the stem 59 to urge the poppet 57 in a valve opening direction to establish a variable flow control orifice 69 between the frusto-conical section 58 and the poppet Industrial Applicability In use, displacement of the main poppet 23 is controlled in the usual manner by controlling the flow of pilot fluid through the pilot passage 36. For example, assuming that the fluid pressure in the inlet port 18 is always greater than or at least equal to the fluid pressure in the outlet port 19, the closing force acting on the main poppet is greater than the valve opening forces when there is no pilot flow through the pilot passage 36 resulting in the main poppet 23 being held in the closed position.

Fluid flow through the main flow passage 17 is initiated by applying an electrical signal to the solenoid 67 so that a control force is exerted against the stem 59 displacing the pilot stage poppet 57 leftwardly against the force of the spring 63. This unseats the frusto-conical section 58 from the second stage poppet 46 causing fluid to flow through the flow control orifice 69. This, in turn, causes fluid flow through the orifices 53 generating a pressure drop between the actuating chamber 51 and the control chamber 52. At some point in the leftward displacement of the pilot stage poppet 57, the valve closing forces acting on the second stage poppet 46 become lower than the valve opening forces. The second stage poppet is then displaced leftwardly essentially following the leftward displacement of the pilot stage poppet and establishes fluid flow through the fluid regulating orifice 56 between the inlet portion 37 and the outlet portion 38. The leftward displacement of the second stage poppet 46 continues until the pilot stage poppet stops and the valve opening and valve closing forces acting on the second stage poppet equalize. The leftward displacement of the pilot stage poppet stops when the valve closing forces acting thereon and the control forces exerted by the solenoid are in equilibrium. Thus, displacement of the second stage poppet 46 is essentially proportional to the level of the control force exerted by the solenoid 67.

Opening of the flow regulating orifice 56 establishes fluid flow through the flow control orifices 29 between the inlet port 18 and the control chamber 28 and through the pilot passage 36 to lower the fluid pressure in the control chamber 28 due to the restriction created by the flow control orifices 29. As the size of the flow regulating orifice 56 increases, eventually the valve closing forces acting on the main poppet 23 become lower than the valve closing forces resulting in the poppet 23 being displaced upwardly to establish fluid flow through the main flow passage 17. The upward movement of the poppet 23 and, thus, the amount of fluid flow through the main flow passage 17 is determined by the amount of pilot flow between the inlet port 18 and the control chamber 28 which, in turn, is modulatably controlled by the degree of opening of the pilot stage poppet 57 and the second stage poppet 46. At a steady state position of the pilot and second stage poppets, the flow through the flow control orifices 29 equals the flow through the pilot passage 36. The flow through the main flow passage 17 is a proportional amount greater than the flow through the pilot passage 36.

A new position of the second stage poppet 46, and hence the main poppet 23, can be obtained by increasing or decreasing the strength of the electrical signal to the solenoid 67 and, thus, the level of control force exerted on the pilot stage poppet 57. Complete removal of the electrical signal results in both the pilot stage and second stage poppets moving to the flow blocking positions shown.

In view of the above, it is readily apparent that the structure of the present invention provides an improved pilot valve for a flow amplifying poppet valve in which flow forces acting on the pilot valve are relatively low, thereby permitting the use of a less expensive low force solenoid. This is accomplished by the use of a two-stage displacement controlled solenoid poppet valve having a second stage poppet for controlling the main pilot flow and a pilot stage poppet for controlling displacement of the second stage poppet. The pilot stage poppet controls only a small portion of the total pilot flow through the pilot passage and, thus, the flow forces acting on the pilot stage poppet are very small. The flow forces exerted against the second stage poppet are not transferred to the pilot stage poppet. Moreover, since the displacement of the second stage is controlled by and is substantially proportional to movement of the pilot stage poppet, very accurate control of the pilot fluid flow through the pilot passage is obtained.

Other aspects, objects and advantages of this invention can be obtained from study of the drawings, the disclosure and the appended claims.

I claim:

1. A flow amplifying poppet valve comprising:

a housing having a main fluid passage having an inlet port and an outlet port;

a main poppet disposed between the inlet and outlet ports and defining a first control chamber in the housing, the poppet including a first annular reaction surface continuously subjected to pressurized fluid from the inlet port and a variable orifice communicating the inlet port with the first control chamber;

a pilot fluid passage having an inlet portion communicating with the first control chamber and an outlet portion communicating with the outlet port;

a two-stage pilot valve disposed within the pilot fluid passage including:

a second stage poppet disposed between the inlet and outlet portions and defining a second control chamber in the housing, the second stage poppet having a fluid passage extending axially therethrough and a second annular reaction surface continuously subjected to pressurized fluid from the inlet portion, the second stage poppet being movable between a closed flow blocking position and an open position establishing a variable flow regulating orifice between the inlet and outlet portions;

a pilot stage poppet having a stem extending through the fluid passage in the second stage poppet and a frusto-conical section engagable with one end of the second stage poppet;

an orifice communicating the inlet portion with the second control chamber;

a spring resiliently biasing the frusto-conical section into blocking engagement with the second stage poppet; and means for selectively exerting a variable control force to urge the pilot stage poppet in a valve opening direction so that a variable flow control orifice is established between the frusto-conical section and the second stage poppet.

2. The flow amplifying poppet valve of claim 1 including an actuating chamber defined in part by the second annular reaction surface and being in continuous communication with the inlet portion.

3. The flow amplifying poppet valve of claim 2 wherein the orifice is provided in the second stage poppet and communicates the actuating chamber with the second control chamber.

4. The flow amplifying poppet valve of claim 3 including a bore in axial alignment with the fluid passage in the second stage poppet, the pilot stage poppet having a plunger slidably disposed in the bore.

5. The flow amplifying poppet valve of claim 4 wherein the fluid passage in the second stage poppet has a first cross-sectional area and the bore has a second cross-sectional area substantially equal to the first cross-sectional area.

6. The flow amplifying poppet valve of claim 5 wherein the force exerting means is a solenoid having a plunger in abutment with the stem of the pilot stage poppet.

7. The flow amplifying poppet valve of claim 5 wherein an end of the plunger is continuously subjected to the pressurized fluid in the outlet portion and the fluid pressure generated forces acting on the pilot stage poppet in one direction are balanced by fluid pressure generated forces acting on the pilot stage poppet in an opposite direction.

8. A two stage displacement controlled poppet valve comprising:

a housing having a fluid passage having an inlet portion and an outlet portion;

a second stage poppet disposed between the inlet and outlet portions and defining a control chamber in the housing, the second stage poppet having a fluid passage extending axially therethrough and an annular reaction surface continuously subjected to pressurized fluid from the inlet portion, the second stage poppet being movable between a closed flow blocking position and an open position establishing a variable flow regulating orifice between the inlet and outlet portions;

a pilot stage poppet having a stem extending through the fluid passage in the second stage poppet and a frusto-conical section engagable with one end of the second stage poppet;

an orifice communicating the inlet portion with the control chamber;

a spring resiliently biasing the frusto-conical section into blocking engagement with the second stage poppet;

means for selectively exerting a variable control force to urge the pilot stage poppet in a valve opening direction so that a variable flow control orifice is established between the frusto-conical section and the second stage poppet; and a bore in axial alignment with the fluid passage in the second stage poppet, the pilot stage poppet having a plunger slidably disposed in the bore with the plunger having an end continuously subjected to the pressurized fluid in the outlet portion.

9. The two stage displacement controlled poppet valve of claim 8 wherein the fluid passage in the second stage poppet has a first cross-sectional area and the bore has a second cross-sectional area substantially equal to the first cross-sectional area.

10. The two stage displacement controlled poppet valve of claim 9 wherein the force exerting means is a solenoid having a plunger in abutment with the stem of the pilot stage poppet.

11. The two stage displacement controlled poppet valve of claim 9 wherein fluid pressure generated forces acting on the pilot stage poppet in one direction are balanced by fluid pressure generated forces acting on the pilot stage poppet in the opposite direction.

* * * * *